United States Patent [19]
Galbraith, Jr.

[11] 3,962,707
[45] June 8, 1976

[54] CAMERA DIAPHRAGM WITH FOLLOW FOCUS CONTROL

[75] Inventor: Floyd M. Galbraith, Jr., Rochester, N.Y.

[73] Assignee: Eastman Kodak Company, Rochester, N.Y.

[22] Filed: Mar. 19, 1975

[21] Appl. No.: 559,937

[52] U.S. Cl.................................. 354/44; 354/196; 354/271
[51] Int. Cl.²......................................... G03B 7/08
[58] Field of Search ............................. 354/42–44, 354/47, 270, 271, 196

[56] References Cited
UNITED STATES PATENTS
3,714,871   12/1973   Bresson.................................. 354/43

*Primary Examiner*—L. T. Hix
*Assistant Examiner*—James LaBarre
*Attorney, Agent, or Firm*—John L. Palmer

[57] ABSTRACT

Camera diaphragm control apparatus in which slidable diaphragm blades are adjustable by a differential motor to establish and continually maintain an exposure aperture of size related to ambient scene brightness. A linkage, responsive to mounting a flash unit on the camera, connects the differential motor to a focus control member. Through the linkage, the focus control can override the adjustment of the diaphragm by the differential motor, and permit diaphragm adjustment with both ambient light and focus of the camera with distance to the photographic object.

2 Claims, 2 Drawing Figures

CAMERA DIAPHRAGM WITH FOLLOW FOCUS CONTROL

BACKGROUND OF THE INVENTION

1. Field of the Invention

This invention relates to apparatus for adjusting a diaphragm in a flash mode to a size that corresponds to scene brightness and to focus of the camera with distance to the photographic object.

2. Description of the Prior Art

Commonly assigned U.S. Pat. No. 3,714,871 issued to Richard J. Bresson discloses camera diaphragm apparatus in which the relative position of first and second diaphragm blades are controlled in relation to scene brightness by a differentially-controlled motor. The relative position of the diaphragm blades is continually varied as scene brightness varies to effect corresponding changes in the size of an exposure aperture. When scene brightness decreases to a predetermined level, the apparatus adjusts the blades to set the exposure aperture at its maximum size; a tripod may be required for using an extended exposure time. On the other hand, the operator may choose to use auxiliary light e.g., a flash unit.

The apparatus of the Bresson patent responds to the flash unit being mounted to the camera by actuating a focus controlled linkage that acts on the diaphragm blades to adjust the exposure apertures during focus adjustment. The blades are made of thin metal and any torque acting directly on the blades may possibly cause the blades to buckle. By transfering any linkage torque directly to the motor, the possibility of buckling is eliminated.

SUMMARY OF THE INVENTION

An object of my invention is to provide diaphragm apparatus that, in a flash mode, permits manual adjustment of a diaphragm adjusting motor with focus adjustment.

Another object of my invention is to directly couple a focus adjustment with a diaphragm-adjusting motor and flash unit sensing device to provide apparatus which, upon focus adjustment, acts directly upon the diaphragm adjusting motor.

These and other objects are attained in one embodiment of my invention in a camera that includes a pair of diaphragm blades coupled with a differential motor and light responsive circuit. The circuit and motor control the position of the diaphragm blades to establish and continually maintain an exposure aperture of size related to scene brightness. The apparatus includes a focusable lens, lens focus control and a linkage that is actuatable to connect the focus control to the motor during exposure under an auxiliary lighting condition, e.g. when a flash unit is mounted on the camera. Upon adjustment of the focus control, the motor is controlled manually while still electrically connected in circuit; thus the diaphragm blades are adjustable to form an exposure aperture in relation to scene brightness and to the position of the focus control.

Specifically, during operation in low scene brightness, the motor positions the diaphragm blades to form the maximum aperture size. At such aperture size, flash illuminated exposure at a close object distance may result in overexposure. Accordingly, the apparatus provides for mounting a flash unit to the camera to enable a slider to connect the focus control directly to the rotatable element of the motor. Adjustment of the focus control moves the slider to rotate the motor, and thus forces the diaphragm blades to move against the drive of the motor to form a smaller aperture size.

BRIEF DESCRIPTION OF THE DRAWINGS

The invention, its objects and advantages, will become more apparent in the detailed description of the preferred embodiment, presented in conjunction with the accompanying drawings in which.

DETAILED DESCRIPTION OF THE PREFERRED EMBODIMENT

Because photographic cameras are well known, the present description will be directed in particular to elements forming part of or cooperating more directly with the present invention, camera elements not specifically shown or described herein are understood to be selectable from those known in the art.

Figure 1:
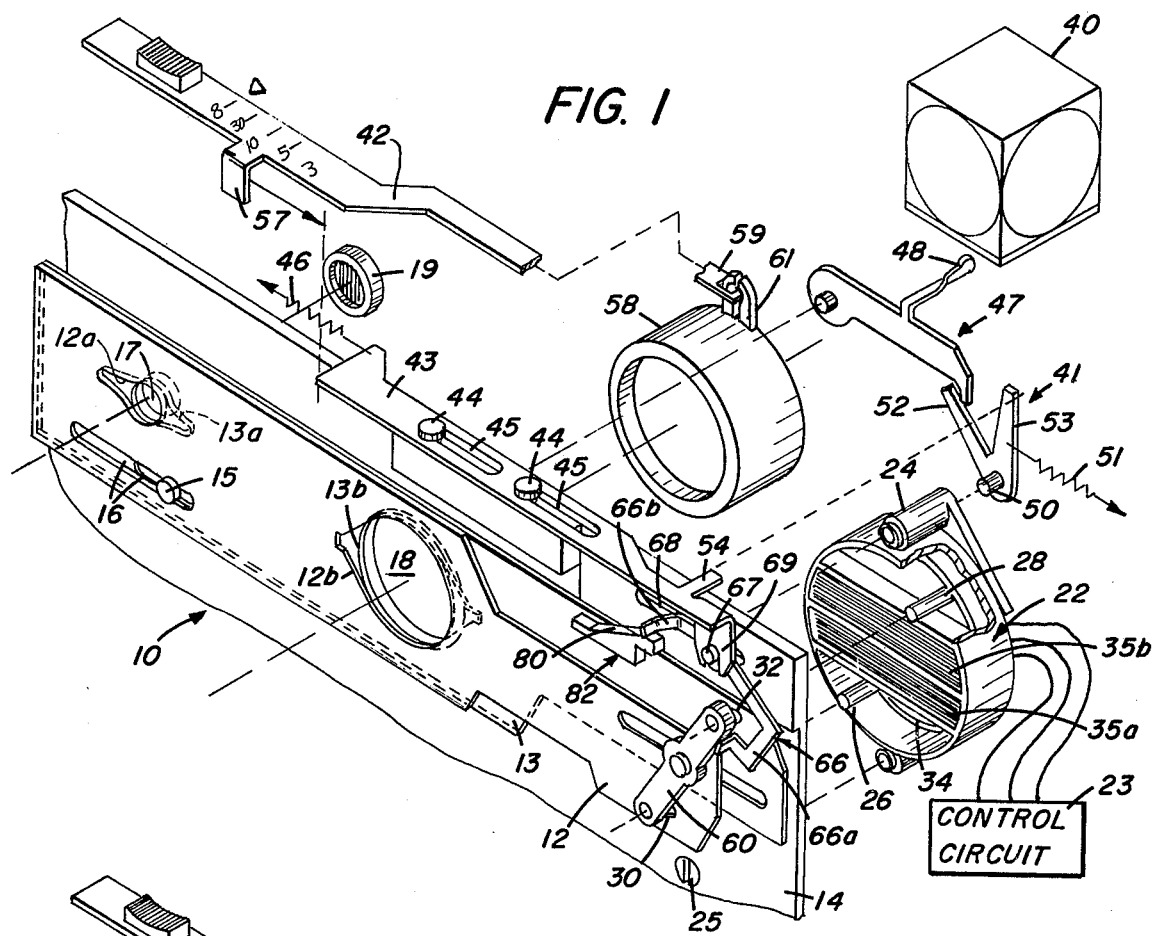
FIG. 1 is a perspective view of a diaphragm according to the preferred embodiment, shown in its full open position.

Referring first to FIG. 1 there is shown an adjustable camera diaphragm 10, of the type including a pair of blades 12,13. The blades 12,13 are mounted to a suitable support 14 by a pin 15, received in blade slots 16, so that they may be laterally moved relative to each other, but in opposite directions. The blade 12 defines tapered apertures 12a,12b and the blade 13 defines similar apertures 13a,13b. In the manner that the blades 12,13 are mounted, the aperture pairs 12a, 13a overlie each other and aperture pairs 12b,13b overlie each other to form a photocell aperture 17 and exposure aperture 18 respectively. The apertures 12a, 12b and 13a,13b are tapered and their tapered portions extend in opposite directions with respect to each other along the line of travel of the blades 12,13. Thus opposite movement of the blades increases or diminishes the size of the apertures 17,18. The photocell aperture 17 regulates the amount of light striking a photocell 19, and the aperture 18 regulates the amount of light permitted to strike the film (not shown).

The blades 12,13 are coupled to, and movable by, a differential motor 22, under the influence of an electronic circuit 23. One such electronic circuit 23 that is suitable for use with the invention may be of the type disclosed in commonly assigned U.S. Pat. No. 3,714,871 issued to Todd D. Cochran. The circuit of the Cochran patent includes the photocell 19 and uses a light sensitive, differential circuit with feed-back damping to regulate and maintain the aperture 18 at size related to scene brightness. The circuit 23 is also adapted to produce an exposure interval of fixed duration (for example 1/300 sec.) until the maximum aperture 18 is reached, and then increases the duration of the exposure interval to correspond to decreasing scene brightness. A bracket 24, which may be plastic or the like and also part of the motor 22, mounts the motor 22 to the support 14 by means of screws 25 that pass through the support 14 and are received into the bracket 24.

Figure 2:
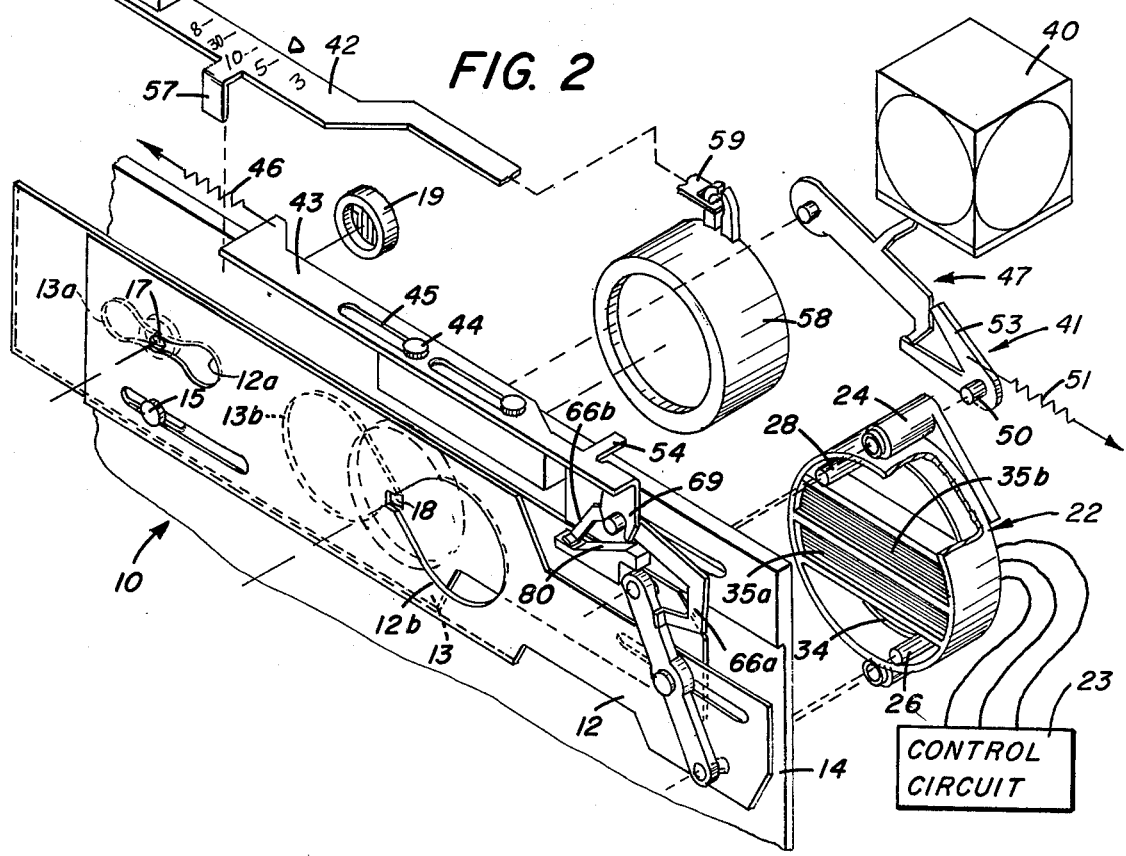
FIG. 2 is a perspective view of the diaphragm of FIG. 1 in which the diaphragm has been adjusted in relation to focus.

To couple the motor 22 to the blades 12,13, the motor 22 includes pins 26,28 that extend through oblique slots 30,32 respectively of the blades 12,13. The pins 26, 28 are attached to, and movable with a magnet 34 of the motor 22 that is located to be movable relative to oppositely wound coils 35a,35b also part of the motor 22; current flowing in the coils 35a and 35b produces rotational motion of the magnet 34, and translational motion of the blades 12, 13, in a direction that depends upon the current flowing in the coils 35a,35b. During operation in ambient lighting conditions, the motor 22 drives the blades 12,13 to form the apertures 17,18 that are of size related to ambient scene brightness. The circuit and motor combination then operates to continually adjust the size of the apertures 17,18 as scene brightness varies. An exposure aperture 18, related to scene brightness, is therefore always maintained. As previously stated, when light intensity decreases to a level such that the exposure aperture 18 becomes adjusted to its maximum size, the circuit 23 produces an exposure interval of increasing duration as scene brightness decreases. As the exposure duration increases, an interval will be reached during which a camera operator has great difficulty handholding the camera steady during the entire interval. Operating the apparatus under such conditions normally requires the use of a tripod. If the operator chooses not to use a tripod but to mount an artificial lighting unit such as a flashcube 40 to the camera, as shown in FIG. 2, the circuit 23 produces an exposure of duration appropriate for flash illumination, and the apparatus may also be operated to control the size of the apertures 17, 18 with the focus of the camera.

To facilitate such control, a latch 41 is responsive to the mounting of the flashcube 40 to the camera, to permit a focus slide 42 to be connected to the motor 22 through a linkage 43. The linkage 43 is shown in FIGS. 1 and 2 to be slidably mounted to the support 14 by pins 44 on support 14 that are received in slots 45 of the linkage 43. A spring 46 urges the linkage 43 toward a position of engagement with the focus slide 42; however, the latch 41 prevents the linkage 43 from engaging the focus slide 42, and being moved thereby, unless a flashcube 40 is mounted to the camera. When a flashcube 40 is mounted, the latch 41 cooperates with a flash unit sensor 47 to permit the spring 46 to move the linkage 43 to engage the focus slide 42. The sensor 47 is pivotally mounted to the support 14 and includes sensing element 48 disposed to be engaged by the flashcube 40.

To couple the latch 41 to the sensor 47 and to the linkage 43, the latch 41 is V-shaped, pivotally mounted to the bracket 24 by a pin 50 and biased by a spring 51 to a position in which an arm 52 of the V engages the sensor 47 and the other arm 53 engages a lock tab 54 of the linkage 43; thus it retains the linkage 43 in an inactive position (FIG. 1) unless a flashcube 40 is mounted to the camera. The inactive position of the linkage 43 corresponds to the infinity setting of the focus slide 42. The linkage 43 is biased from the infinity position by the spring 46 and, upon sensing a flashcube 40 mounted to the camera, the latch 41 pivots, permitting the linkage 43 to move to engage a depending tab 57 of the focus slide 42. The arm 53, when a flashcube 40 is present, occupies a position relative to the movement of the tab 54 such that upon removal of the flashcube 40, the arm 53 engages tab 54 to reset linkage 43. The force of the spring 46 must be large enough to overcome the torque of the motor 22, because, if the focus slide 42 is at a 3-foot setting, its minimum setting, the linkage 43 must force the blades 12,13 against the torque of the motor 22 to adjust from a maximum aperture size to an aperture size corresponding to the 3-foot setting.

The camera includes an adjustable lens 58 aligned with the aperture 18. To connect the lens 58 to the focus slide 42, the focus slide 42 includes a hook 59 connected to an eye 61 of the lens 58. As the focus slide 42 moves, the hook-eye arrangement rotates the lens 58 clockwise or counterclockwise depending upon the direction of motion of the focus slide 52.

To slave the motion of the magnet 34 (and thus the motion of the blade 12,13) to the motion of the focus slide 42, the motor 22 includes a span 60 connected between the pins 26, 28. A rocker 66 is positioned to connect the span 60 to the linkage 43 and to translate the lateral motion of the linkage 43 into rotational motion of the motor 22. The rocker 66 is a two-armed element that is mounted to the support 14 by a mounting pin 67, received in a slot 68; the mounting pin 67 also engages a notched member 69 of the linkage 43. As the linkage 43 is moved laterally, the notched member 69 moves the rocker 66 laterally in the slot 68. One arm 66a engages the span 60, the other arm 66b engages an inclined top 80 of a guide 82. The arm 66b moves along the inclined top 80 as the rocker 66 is laterally moved and the arms 66a,66b cooperate with the guide 82 and span 60 to force the span 60 to move rotationally. As the span 60 rotates, the pins 26,28 slave the motion to the motor 22 and the blades 12,13 are moved to reduce the size of the apertures 17,18. Thus it is seen that in scene brightness at a level in which the apparatus adjusts to its maximum exposure aperture 18, and an exposure of duration occurs that is too long to hand-hold the camera steady during operation, insertion of a flashcube 40 permits further adjustment of the exposure aperture 18 with focus.

The apparatus is also useful during a "fill-in flash" operation. During operation in the ambient mode the exposure aperture 18 may be set to an average size for an average scene brightness e.g., half open or less. However, if a flashcube 40 is inserted for fill-in flash, the subject distance may well be so near the camera that reflected light would overexpose the film. In such event the focus control 42 would override the ambient setting of the aperture 18 to force the aperture 18 to a smaller size; overexposure would be avoided. Correspondingly, in the event that scene brightness is high and focus is set such that an aperture 18 larger than required is formed, the control circuit 23 overrides the focus set aperture 18 and provides a correct setting for ambient light.

The invention has been described in detail with particular reference to preferred embodiments thereof, but it will be understood that variations and modifications can be effected within the spirit and scope of the invention.

I claim:
1. In a camera adapted to receive, a flash unit and having an adjustable diaphragm, a focusable lens and focus control for said lens, apparatus for adjusting said diaphragm in proportion to the focusing of said lens, said apparatus comprising:
   an electronic circuit including an element responsive to scene brightness for influencing said circuit in response to said brightness;
   a differential motor, coupled with said circuit and said diaphragm, for moving said diaphragm to form an aperture of size related to ambient scene bright- ness received by said scene brightness responsive element;

a rocker mounted to be movable about an axis and being located to engage said differential motor;

a slider, associatable with said focus control and said rocker and being movable with movement of said focus control to move said rocker about said axis; and a retainer, coupled with said slider to retain said slider in an inactive condition wherein it is held from movement with said focus control, and being responsive to a received flash unit to permit said slider to move to an active condition wherein it is permitted to move with said focus control, said retainer being disengaged from said slider in said active condition.

2. In a camera adapted to receive a flash unit, and having an adjustable diaphragm, a focusable lens and focus control for said lens, apparatus for adjusting said diaphragm in proportion to the focusing of said lens when a flash unit is received on said camera, said apparatus comprising:

an electronic circuit including an element responsive to scene brightness for influencing said circuit in response to said brightness;

a differential motor, coupled with said circuit and said diaphragm, to move said diaphragm to form an aperture of size related to ambient scene brightness;

a rocker mounted to be movable about an axis and being located to engage said differential motor;

means for sensing said flash unit received on said camera; and a slider, associatable with said focus control and said rocker only when said sensing means senses a flash unit received on said camera, to be movable with movement of said focus control to rotate said rocker about said axis.

* * * * *